United States Patent

[11] 3,592,243

| [72] | Inventors | Yoshikiyo Fukushima Tokyo; Yasushi Ishihara, Tokyo; Kenzo Momota, Tokyo; Yasuo Usui, Chigasaki; Tuyoshi Sakumura, Tokyo; Satoru Sogo, Tokyo; Koji Nunokawa, Tokyo, all of, Japan |
|---|---|---|
| [21] | Appl. No. | 794,900 |
| [22] | Filed | Jan. 29, 1969 |
| [45] | Patented | July 13, 1971 |
| [73] | Assignee | Nippon Concrete Industries Co., Ltd. Tokyo, Japan |
| [32] | Priority | Feb. 26, 1968 |
| [33] | | Japan |
| [31] | | 43-11924 |

[54] METHOD OF FABRICATING PC CONCRETE PIPE REINFORCING
3 Claims, 35 Drawing Figs.

[52] U.S. Cl. .................................................. 140/92.2, 140/112, 264/228
[51] Int. Cl. ....................................................... B21f 3/02
[50] Field of Search ........................................... 140/112, 92.2; 29/155; 264/228; 254/29.5; 25/118.7

[56] References Cited
UNITED STATES PATENTS

| 1,762,815 | 6/1930 | Glöeser | 264/228 |
| 3,162,709 | 12/1964 | Davidson | 264/228 |
| 3,276,092 | 10/1966 | Pankow | 25/118 |
| 3,340,115 | 9/1967 | Rubenstein | 264/228 |

*Primary Examiner*—Richard J. Herbst
*Attorney*—Fidelman, Wolffe and Leitner

ABSTRACT: A method of fabricating reinforcements for PC concrete pipe comprising forming a central cage structure and two end cages of slightly larger diameter than said central cage, positioning the said end cages at each end of said central cage structure, inserting tension reinforcing material along the length of said cage structure, without intertwining said tensioning reinforcing members, and through holes formed on the end surfaces of metal fittings, forming hook ends on the tension reinforcing members, and extending said metal fittings to contact said hook ends and place the tension reinforcing members under tension, the central cage structure being free to move within the end cages, and the end cages being attached to the end surface metal fittings.

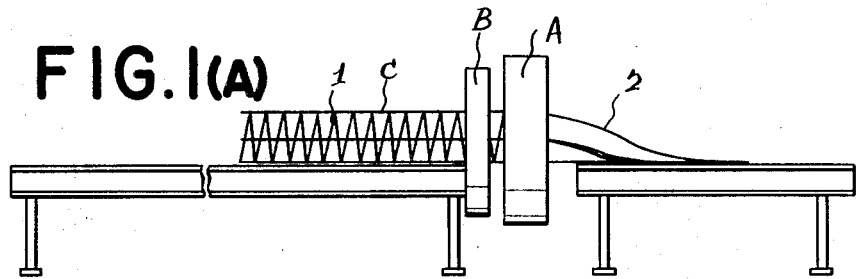
FIG.1(A)
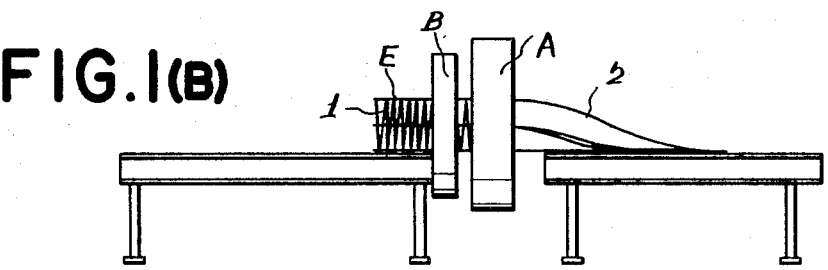
FIG.1(B)
FIG.1(C)
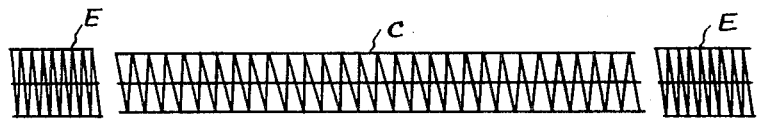
FIG.1(D)
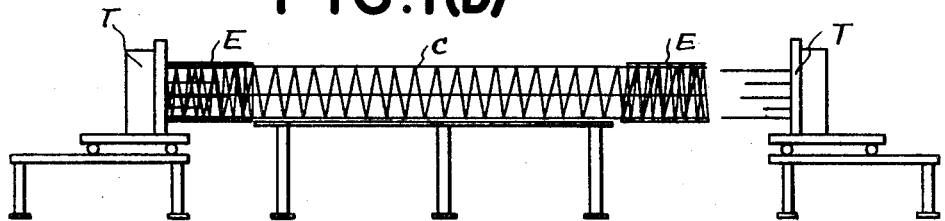
FIG.1(E)
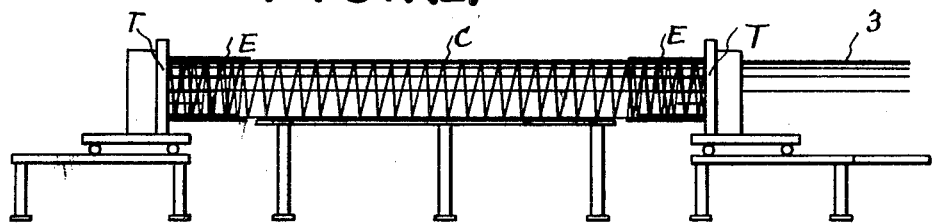

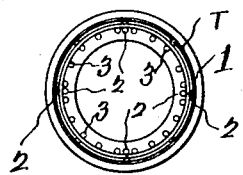
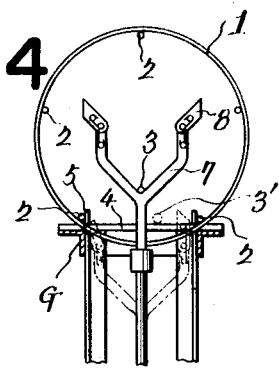
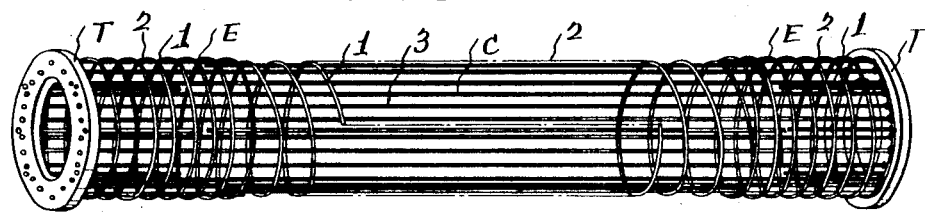
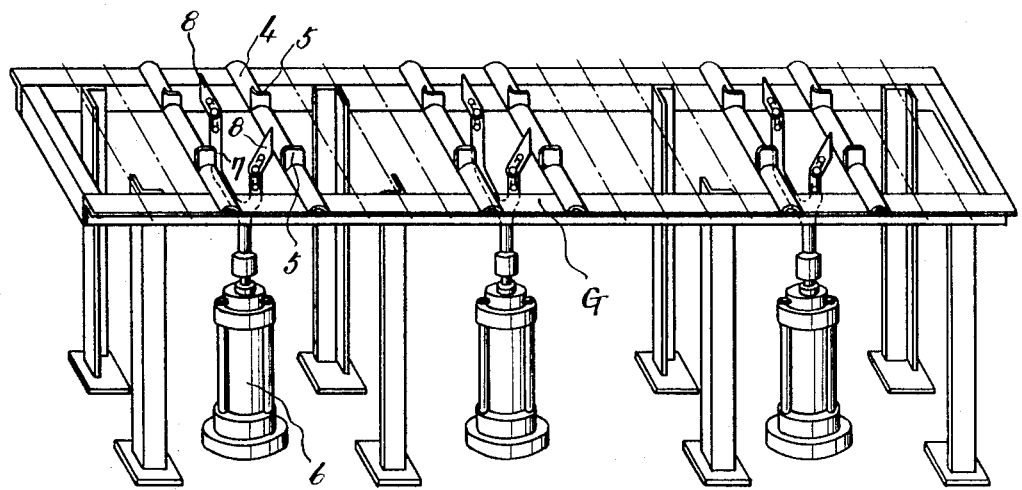

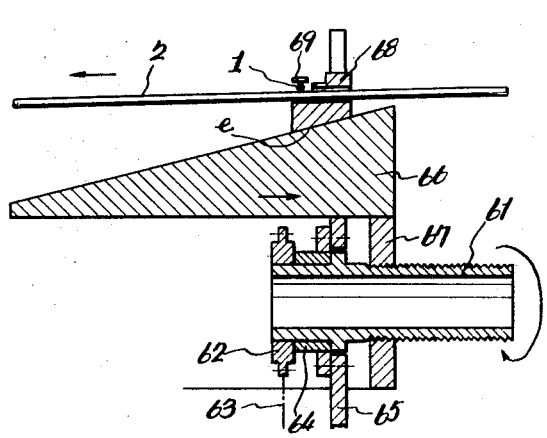
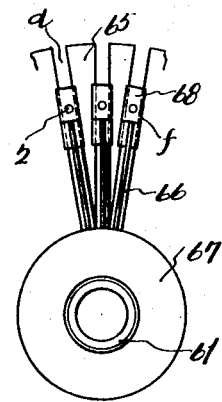
FIG.12(A)   FIG.12(B)
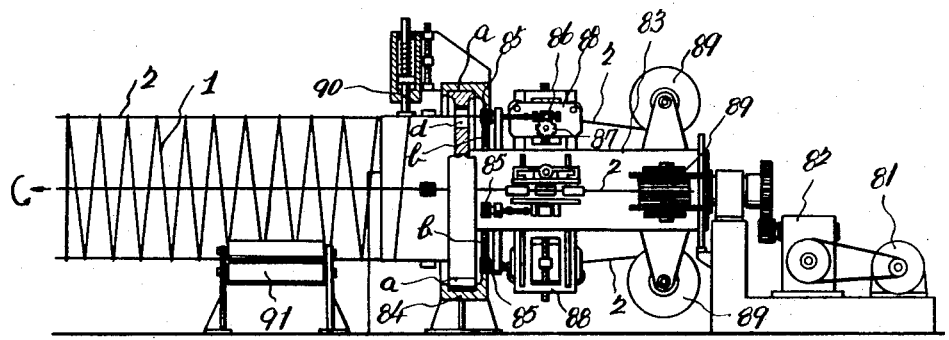
FIG.13(A)
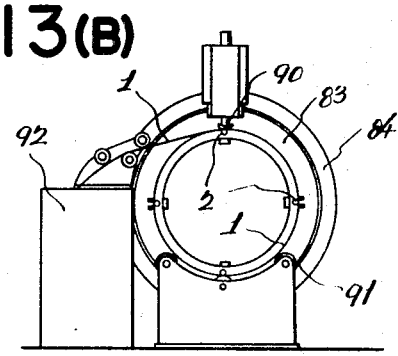
FIG.13(B)

METHOD OF FABRICATING PC CONCRETE PIPE REINFORCING

This invention relates to a novel structure of reinforcements for PC concrete pipes, method of interweaving the same and device for the manufacture thereof.

In the production of PC piles, PC poles and the like, a system so-called independent molding frame wherein generally in the interweavement factory all parts for the interwoven product including tension reinforcements and nontension reinforcements are collected to one set to manufacture a cylindrical cage of reinforcement by combining these parts with each other by a hand rolling operation or an electric welding operation, said cage being transported to the concrete placing factory at the state of preventing deformation thereof, in said factory end surface metal fittings hooking both ends of the tension reinforcement being inserted within the molding frame at a state of imparting tension stretching, thus concrete being placed.

In the reinforcements interwoven by such a conventional method, tension reinforcements are secured to nontension arranged reinforcements (e.g. vertical reinforcements, spiral reinforcements, ring reinforcements, or the like) by a binding line or welding, in the tension reinforcement respective parts are assembled not at a free state but a bound and coupled state, and therefore has such defects as will be described hereinbelow:

1. In the case of hand-rolling operation, extremely many process steps are required for providing connection lines.

2. Since the tension reinforcements are directly connected or welded, it is difficult to retain the tension reinforcements linearly and finish them in a desired precise shape.

3. In order to retain the tension reinforcements in a precise shape and facilitate the transportation thereof, various kinds of prefabricated reinforcements such as ring reinforcement and spacer are required.

4. In the case of welding the tension reinforcement, there is a question of deterioration in the strength of welded portion.

The present invention has for its object to eliminate the aforementioned defects of the conventional reinforcements interweaving system, and it is provided with the following features:

1. In the present invention, a cage body is formed in advance merely by nontension reinforcements, and said cage is constituted generally in combination of a coil-shaped spiral reinforcement with a few vertical reinforcements. The material quality of said cage is mild steel and therefore processing by welding is easily carried out. Hence, the steps required for binding are omissible. The cage body is not always formed by the combination of the coil-shaped horizontal reinforcement with the vertical reinforcements, but it may be formed by the combination of a number of ring-shaped horizontal reinforcements with the vertical reinforcements or formed into an arc shape by other materials like wire net.

2. In the present invention the tension reinforcement which will be prestressed later on is merely hooked to be supported on the end plate at the ends thereof irrelatively to the other nontension reinforcement for merely retaining the shape, and therefore it is free as the entire part. Accordingly, precise position and dimension on the figure are protected without being restricted by other members.

3. When the system of the present invention is employed, the operational efficiency in the interweaving process is remarkably improved and therefore manpower and period of time are reduced to several tens percent.

4. In the system of the present invention, period of time of interweaving reinforcements is remarkably reduced and as the result it becomes possible to carry it out in assembly line production by interweaving it in the entire production process including placement of concrete, and therefore an advantage due to the assembly line production system of the entire process step is produced.

A few examples embodying the present invention will be explained by referring to the accompanying drawings in which;

FIGS. 1 (A) through (I), are respectively a view for explaining steps showing Example 1 embodying the interweaving method according to this invention;

FIGS. 2 (A) and (B) are respectively a side view and a slant view of the interwoven reinforcement;

FIGS. 3 and 4 are respectively an oblique view and a side view of a part of the device used in Example 1;

Figure 1F:
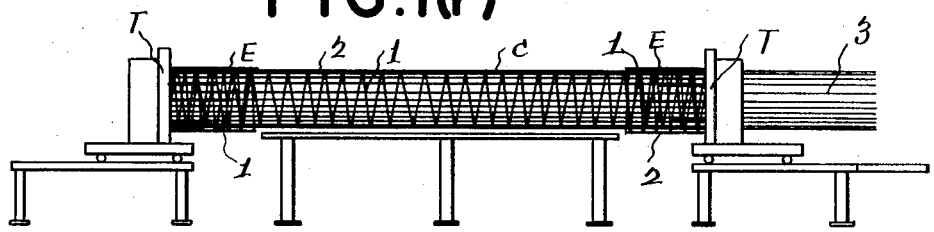
Figure 1G:
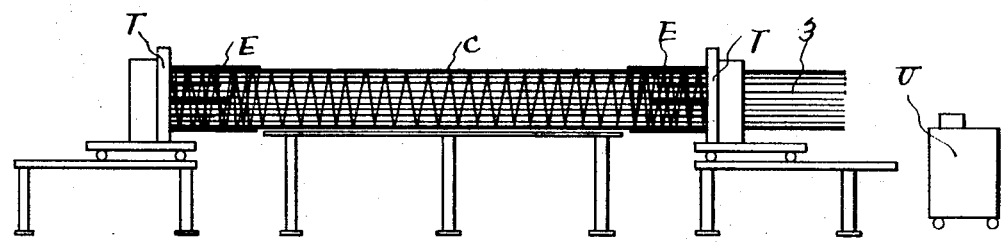
Figure 1H:
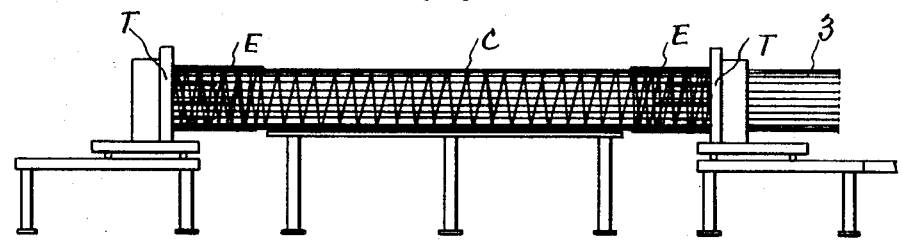
Figure 1I:
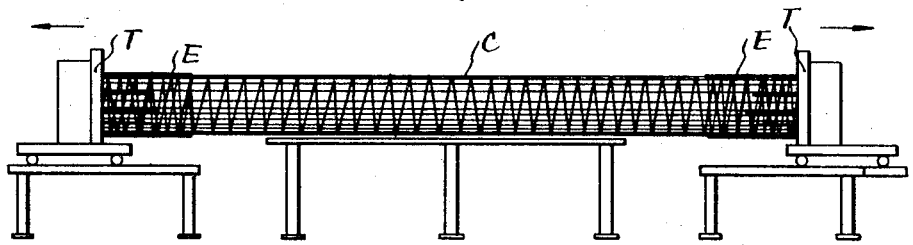

FIGS. 11 (A) through (G) and FIGS. 12 (A) and (B) are respectively a view for explaining a step showing Example 4 embodying the interweaving method according to the present invention, a front view, partly broken away, showing the principal part of the same, and a side view, partly broken away, showing the same;

FIGS. 13 (A) and (B) are respectively a front view and a side view showing Example 1 of the principal part of the device according to the present invention; and FIGS. 14 (A) through (E) are respectively a front view and a side view showing Example 2 and a side view, on an enlarged scale, showing the essential part of the same.

FIGS. 1 (A) through (I) indicate in order the interweavement process in Example 1. FIG. 1 (A) illustrates the process step of interweaving the central cage, in which a spiral reinforcement 1 formed into a coil shape by way of the spiral forming welded portion A is exhausted in a state where portions in contact with an interwoven reinforcement 2 in the vertical direction are welded together, and cut in a suitable length by means of a cutter B. This is a central cage C which constitutes the central portion. FIG. 1 (B) illustrates an end cage assembling process step, and an end cage E having an outer diameter slightly larger than that of the cage C and a small pitch. FIG. 1 (C) illustrates a cage assembling process step in which end cages E and E are arranged at both ends of the central cage C. FIG. 1 (D) illustrates a step of mounting end surface metal fittings, in which cages E and E are respectively outwardly inserted at both ends of the central cage C arranged on the base and supported by end surface metal fittings T provided on the base. FIG. 1 (E) illustrates a tension reinforcement inserting step in which a tension reinforcement 3 having a hooking portion at its left end is inserted from the left side through a hole formed on the periphery having a diameter equivalent to that of the cage at the end surface metal fittings T. Accordingly, the tension reinforcement 3 is merely supported at its both ends by the hole formed on the end surface metal fittings T and the central portion thereof is at a quite free state within the central cage C and the end cage E. In the tension reinforcement inserting step it is convenient to use a guide base G for use in the course regulation as will be described hereinbelow so as to prevent the advancing end of the tension reinforcement 3 from coming into collision with the spiral reinforcement 1 and intermingling with each other. FIG. 1 (F) illustrates the state of completing the insertion. FIG. 1 (G) illustrates an upsetting step, in which a hooking portion of a rivet head or the like at its right end of the tension reinforcement 3 by means of an upsetter U. FIG. 1 (H) illustrates its completed state. FIG. 1 (I) illustrates a pulling step, in which the end surface metal fittings T and T at both ends are pulled in the reverse direction and the tension reinforcement 3 is maintained at a state where rivet heads at its both ends come into contact with outsides of insertion holes, respectively. At this state, end cages E and E outwardly inserted double into the central cage C assumes a state where the majority thereof is pulled out. At this state, while imparting tension to the tension reinforcement in a manner identical with the case of the conventional method, it is set within a circular frame to place concrete.

FIGS. 2 (A) and (B) show a detailed structure of the reinforcements constituted by aforesaid steps.

Then, FIGS. 3 and 4 show the guide base G used in the step of inserting the tension reinforcement in FIG. 1 (E), and when cages C and E are placed thereon, the spiral reinforcement 1 is positioned between transverse frames 4 having a pitch equivalent to that of said spiral reinforcement 1, and cages C and E are supported by the interwoven reinforcement 2 in the axial direction. Accordingly, the central portion of the transverse frame 4 is at the inner part of cages C and E, and therefore when the tension reinforcement 3 is passed through the upper side of transverse frame 4 in the central portion of guide members 5 and 5, the tension reinforcement 3 can pass without colliding with the spiral reinforcement 1. Then, when the second tension reinforcement 3 is passed, there is a fear of its becoming entangled with the first tension reinforcement 3. In order to prevent it from occurring, it is preferable to provide a suitable number of assortment devices at a suitable portions of the guide base G. This device comprises a pawl 8 opened constantly outwardly by means of a spring and provided at both ends of a fork 7 vertically movable by means of a cylinder 6, and in a case where the second tension reinforcement 3' is passed the fork 7 is lifted at first by introducing air or the like into said cylinder 6. Therefore the first tension reinforcement 3 is lifted by means of the fork 7 so that when the second tension reinforcement 3' is passed through the side of supporting rod at the lower part of said fork 7, the entanglement of both reinforcements can be prevented because the second tension reinforcement 3' is separated from the first tension reinforcement 3. Then, when the fork is dropped, the second tension reinforcement 3' slides on the outer side of fork 7 and positions at the upper part thereof. When the fork 7 is lifted at this state, the second tension reinforcement 3' is placed at the inner part of fork 7 by the pawl 8 and therefore assumes the same state as the first tension reinforcement 3. In this manner, it is possible to pass the required reinforcements while preventing mutual entanglement thereof. When the end surface metal fittings T and T at both ends are rotated, the tension reinforcement 3 already penetrated also rotates, and hence by repeating the similar tension reinforcement passing operation at the rotated state the entire tension reinforcement can be passed without entanglement with each other.

Figure 5:
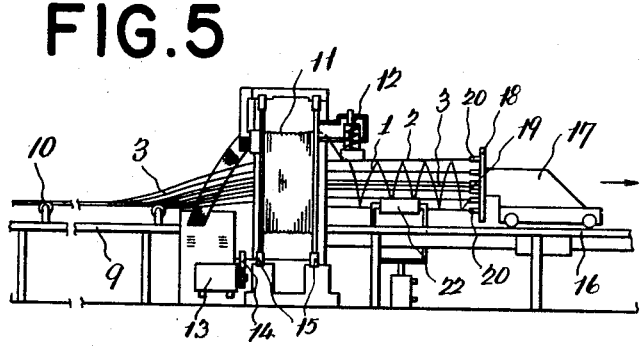
FIGS. 5 and 6 are respectively a front view and a sectional view, partly on an enlarged scale, showing Example 2 embodying the interweaving method according to the present invention.
Figure 6:
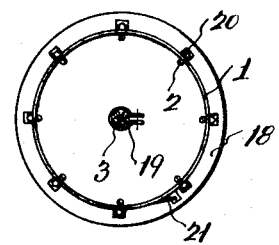

Then FIGS. 5 and 6 respectively show an interweavement step in the Example 2 embodying the present invention. More particularly, in the method shown in the aforementioned Example 1, nontension reinforcement and spiral reinforcement are combined to arrange reinforced cage, and thereafter the tension reinforcement is inserted into the inner part thereof. Since it shows two stage steps, it is difficult to automate these steps, and particularly in the concrete pole of small diameter there is a drawback that the after-insertion of tension reinforcement is difficult. The present invention is devised with the intention of improving such a drawback and to provide a tension reinforcement simultaneously with the arrangement of reinforced cage consisting of vertical reinforcement and spiral reinforcement. In the drawings, reference numeral 1 designates a spiral reinforcement, 2, a nontension vertical reinforcement, and 3, a tension reinforcement. Reference numeral 9 designates a base for supplying a steel wire for tension reinforcement 3 and nontension vertical reinforcement 2 which is provided with a roller or the like 10 at its upper surface. Reference numeral 11 designates a bobbin for spiral reinforcements, which rotates around the central axis, whose both side plates are provided with gears, and at one side surface thereof an electric welding apparatus 12 is provided, and at its hollow portion a steel wire guiding device (not shown) is inserted and secured. Reference numeral 13 designates an electric motor which rotates the aforementioned bobbin 11 for use in said spiral reinforcement through a reduction mechanism 14 and gears 15. Reference numeral 16 designates a sliding base, 17, a traction device which travels on the rail (not shown) of said sliding base 16, on said device 17 a disc 18 for fitting reinforcing materials is mounted. In the center of said disc 18 for fitting reinforcing materials a chuck 19 which assembles and fixes the ends of tension reinforcement 3 is attached and on the peripheral portion thereof a suitable number of chucks 20 which fix nontension vertical reinforcement 2 are attached and also a chuck 21 which fixes the forward end of the spiral reinforcement 1 is provided. Reference numeral 22 indicates holders for reinforced cages.

The tension reinforcement 3 and nontension reinforcement 2 are selectively divided in a steel wire guide device (not shown) provided in the hollow inner part of the bobbin 11 for spiral reinforcement by means of a roller or the like 10 at the upper surface of a base for supplying a steel wire and thereafter the tension reinforcement 3 is collected and retained by the chuck 19 provided at the center of a reinforcing materials fitting disc 18 of traction device 17, and the nontension vertical reinforcement 2 is retained by the chuck 20 of said disc 18 and the spiral reinforcement 1 by the chuck 21 at their ends, respectively.

Then, when the motor 13 is rotated, the bobbin 11 for spiral reinforcement rotates at a low speed through the reduction mechanism 14 and gears 15 and supplies the spiral reinforcement 1. The rotation of motor 13 causes the bobbin 11 for spiral reinforcement to rotate and simultaneously allows the traction device 17 to move at a speed relating to its rotation in the direction shown by arrow by means of a wire rope and the like, whereby the spiral reinforcement 1 is wound to the nontension vertical reinforcement 2 in a spiral shape as shown in the drawings, and welded in order at subsequent points with nontension reinforcement 2 by means of an electric welding device 12 operated intermittently to arrange the reinforced cage.

Then FIGS. 7, 8, 9 and 10 show respectively an interweavement step in Example 3 embodying the present invention. More particularly, in the aforementioned Example 2, the nontension vertical reinforcement is shifted in the axial direction without its rotation, and the bobbin of spiral reinforcement and electric welding device are rotated at the outside thereof. Since its mechanism becomes complicated, Example 3 shows a system wherein the nontension vertical reinforcement as well as the tension reinforcement are shifted in the axial direction while rotating, and the bobbin of spiral reinforcement and electric welding device are not rotated at the outside thereof.

In the drawings, reference numeral 1 designates a spiral reinforcement, 2, a nontension vertical reinforcement (hereinafter referred to as vertical reinforcement), and 3, a tension reinforcement. Reference numeral 24 designates a bobbin for vertical reinforcement 2, 25, a coil for spiral reinforcement 1, 26, a rotary plate, 27, a feed roller for the vertical reinforcement 2, 28, a straightening roller, 29, an incorporated motor for driving the feed roller 27, 30, a brush, 31, an oil-pressure chuck for the tension reinforcement 3, 32, an electrode holder, 33, a tractive wheel, 34, end plate metal fittings, 35, a rotation receiving roller, 36, a plate for drawing the tension reinforcement 3, and 37, an upsetter. Also, reference character E denotes cages of small pitch at both ends and C, a cage of large pitch formed at the central portion.

Figure 7:
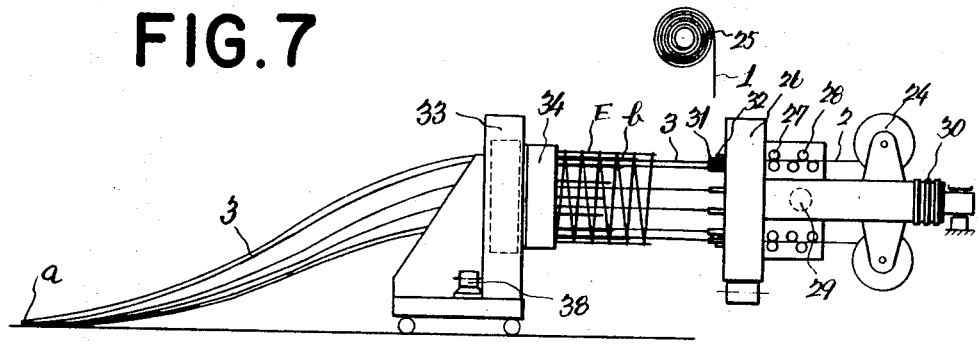
FIGS. 7, 8, 9 and 10 are respectively a front view on each step and a side view of the principal part showing Example 3 embodying the interweaving method according to the present invention.
Figure 8:
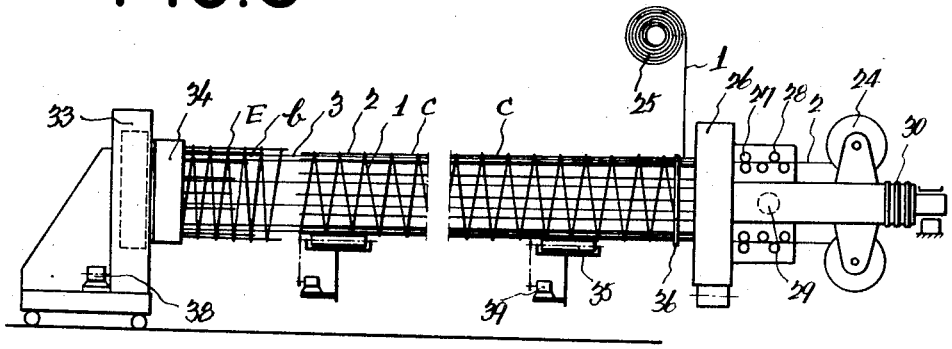
Figure 10:
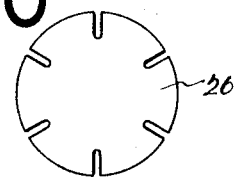

In FIG. 7, the tension reinforcement 3 is provided with a hook portion a at its one end and another end is secured to the rotary plate 26 by the oil-pressure chuck 31 through the hole of end plate metal fittings 34 mounted on the tractive wheel 33 in a rotatable manner. Reference character E denotes cages of small pitch arc both ends formed in advance and are provided by being outwardly inserted in the reinforced bars b at end plate metal fittings 34, in the inner part of said cage said tension reinforcement 3 being inserted. When the tractive wheel 33 is firstly shifted to the left at this state, the tension reinforcement 3 is provisionally stretched between end plate metal fittings 34 and rotary plate 26. Then, while the vertical reinforcement 2 of bobbin 24 is extruded by the feed roller 27 driven by the motor 29, the rotary plate 26 and end plate metal fittings 34 are rotated in synchronism with each other by means of the motor 38. Upon this occasion, while the vertical reinforcement 2 is extruded at one pitch, the rotary plate 6 and the like make one rotation. At this state, when while spiral reinforcement 1 is pulled out of the coil 25, it is wound to the outside of the vertical reinforcement 2 and successively welded at crossing points, the cages C each having a required pitch are formed in order as shown in FIG. 8. Upon this occasion, to prevent the twist of the cages C, the rotation receiving roller 35 driven by the motor 39 is supported to straighten the twist.

Figure 9:
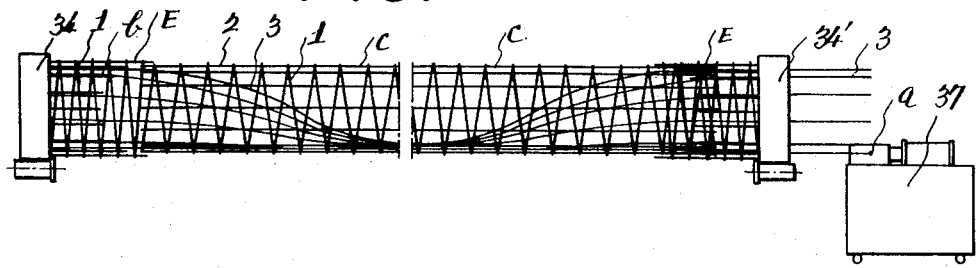
Figure 11A:
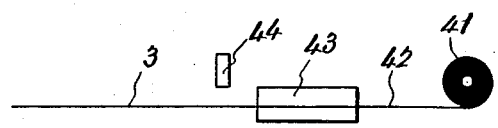
Figure 11B:
Figure 11C:
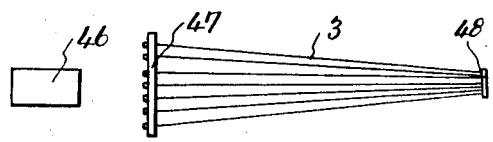
Figure 11D:
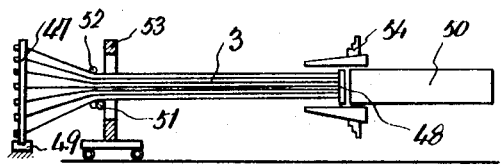
Figure 11E:
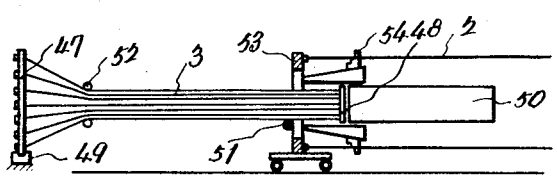
Figure 11G:
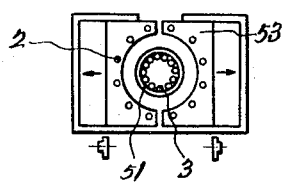
Figure 11F:
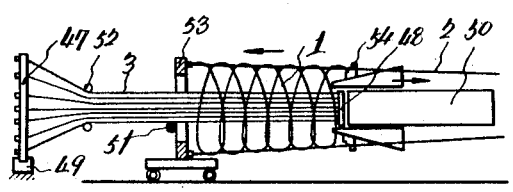
Figure 14A:
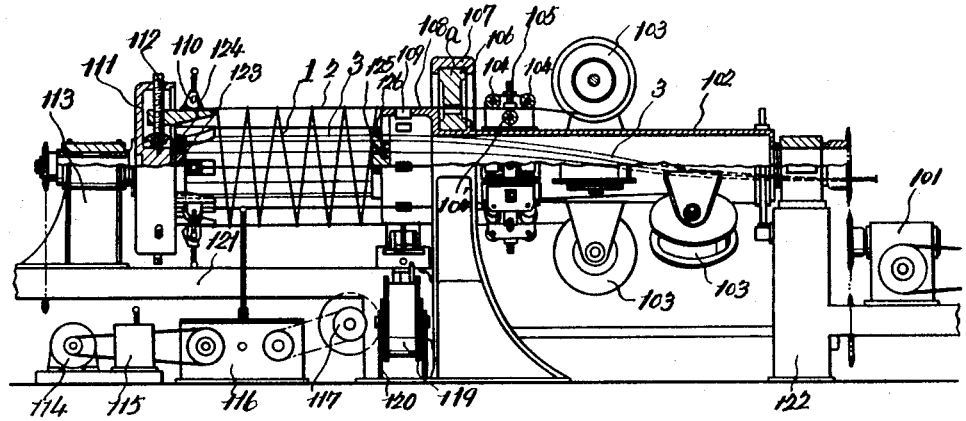
Figure 14B:
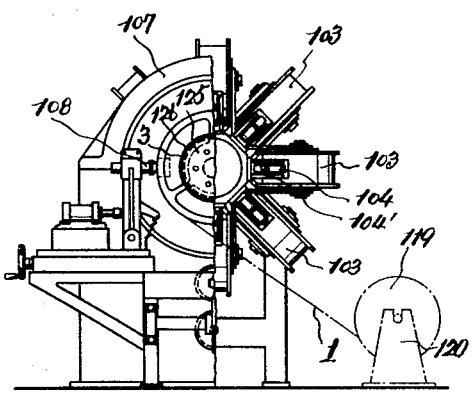
Figure 14C:
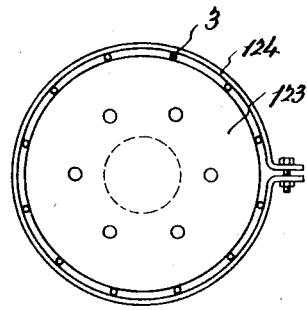
Figure 14E:
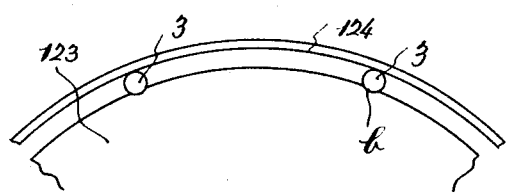
Figure 14D:
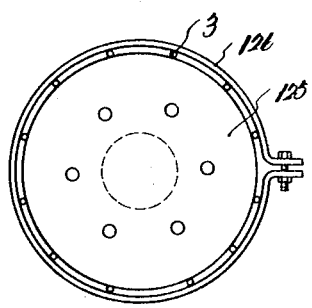

When the central cages C are completed, the vertical reinforcement 2 and spiral reinforcement 1 at the right end thereof are cut to disengage the right end of the tension reinforcement 3 from the oil-pressure chuck 31 and the cage E having a small pitch at the right side is communicated with end plate metal fittings 34' at the right side. Also, the end plate metal fittings 34 at the left end is disengaged from the tractive wheel 33. At this state, as shown in FIG. 9, the both end plates metal fittings 34 and 34' are rotated, and the right end of the tension reinforcement 3 is gradually heated and compressed by means of the upsetter 37 to form the hooked portion $a$ at the forward end.

Then, FIGS. 11 (A) through (F) and FIGS. 12 (A) and (B) show respectively an interweavement step in Example 4 embodying the present invention. This example particularly shows a step of arranging reinforced cage suitable for concrete pole. FIG. 11 (A) shows a step of cutting the tension reinforcement at the predetermined length, the tension reinforcement wire 42 supplied from coil 41 passes through a straightening machine 43 to become linear, and cut in the predetermined length by means of a cutter 44 whereby the tension reinforcement 3 having predetermined length is obtained and placed in the reinforcement yard as shown in FIG. 11 (B). In the tension reinforcement setting step shown in FIG. 11 (C), a required number (14 pieces in this case) of tension reinforcements 3 are drawn out and each one end thereof is heated and compressed by an upsetter 46 to be shaped into a rivet head form and hooked to a tension plate 47 and each another end is retained by a clamp 48 and set in a cone shape.

In the first step for the preparation of the interweavement shown in FIG. 11 (D) the tension plate 47 is secured to a supporting base 49 and the clamp 48 is supported by a fitting base 50 and a throttle ring 52 possible to be cut into two is provided whereby the majority of tension reinforcements 3 are squeezed so that they become parallel with portions of clamp 43, at said parallel portions a tractive wheel 53 provided with a squeezing roller 51 for vertical reinforcement (nontension reinforcement) being provided. Said tractive wheel 53 is possible to be cut into two as shown in FIG. 11 (G), and said tension reinforcements 3 are easily provided by positioning them between two cut portions of said tractive wheel. Reference numeral 54 designates a vertical reinforcement guide device and its detailed structure is indicated in FIGS. 12 (A) and (B).

In the second step for preparing the interweavement shown in FIG. 11 (E), while each one end of vertical reinforcements (nontension reinforcements) 2 is secured to the tractive wheels 53, the arrangement is just going to be started by shifting it to the right end.

In the interweavement step shown in FIG. 11 (F) the tractive wheel 53 travels to the left while pulling the vertical reinforcements 2, and as illustrated in FIG. 12, the vertical reinforcement guide device 54 travels to the right in interlocking with the motion of tractive wheels 53 and the outer diameter of the bundle of vertical reinforcements 2 is gradually reduced and shaped into a cone form, and while electrodes (not shown) are guided by said device 54 in the same manner, interlock with said motion and travel around the axis to weld the spiral reinforcement 1 and vertical reinforcement 2 at a predetermined portion. Thus, the reinforced cage having predetermined length and taper are arranged. Since the tension reinforcement set by the tension plate 47 and clamp 48 is inserted in the inner part of the cone-shaped reinforced cage arranged at this state, it is possible to shift it to the subsequent concrete pouring step, and in the case of concrete pole, it is possible to remarkably increase the operational efficiency by interweaving the reinforced cage fabricating step thereinto as a series of assembly line operation.

Then, one example of vertical reinforcement guide device and welding machine respectively will be explained by referring to FIGS. 12 (A) and (B). Reference numeral 61 is a screw to which a sprocket wheel 62 is fixed at its one end and which is driven to rotate by means of a chain 63. A bearing 64 is mounted on part of the screw 61, and said screw 61 is supported in a freely rotatable manner by said bearing 64 against a stationary guide plate 65. The stationary guide plate 65 is provided with a number of radial slots $d$ and taper plates 66 inserted in said radial slots in a freely slidable manner are respectively secured to guide nuts 67 driven in screws 61. Reference numeral 68 designates electrode receivers which are inserted into the radial slots $d$ of stationary guide plates 65 in a freely slidable manner and each of which has a taper shaped inner surface $e$ in contact with the outer surface of the taper plate 66 and a protuberant angle $f$ engaged with the stationary guide plate 65. Reference numeral 69 designates electrodes.

In the aforementioned structure, when the vertical reinforcement 2 is shifted to the left by the tractive wheels 53 and the chain 63 is driven in interlocking therewith as has been described in the foregoing, the electrode receiver 68 accompanied by the vertical reinforcement 2 moves radially in the direction of the center in accordance with the rotation of sprocket wheel 62 and hence in accordance with the movement of the guide nuts 67 driven in the screw 61 and the taper plate 66 in the axial direction, the electrode receiver 68 radially moves in the central direction by being accompanied by vertical reinforcement 2, and by the electrode 69 and the reel of spiral reinforcement 1 which gradually intermittently move around the axis by a mechanism (not shown) the spiral reinforcement 1 is gradually welded with the vertical reinforcement 2 at the desired outer diameter position, whereby taper cone-shaped reinforced cages are automatically fabricated and simultaneously tension reinforcement 3 can be inserted thereinto.

FIGS. 13 (A) and (B) show respectively one example of a device for continuously supplying vertical reinforcements forming essential parts in the aforementioned various reinforced cage fabricating device. In the drawing, reference numeral 1 designates a spiral transverse reinforcement, and 2 designates a vertical reinforcement. By arranging both reinforcements reinforced cages are formed. The main body 83 is rotated through a reduction machine 82 driven by a motor 81 and a gear mechanism. The front part $a$ of the main body 83 is supported by the machine body 84. Several gears 85 which engage with gears $b$ in the machine body 84 are supported by the protuberant portion of the main body 83 in a freely rotatable manner. A worm 86 which is coaxial with said gear 85 engages with a worm wheel 87. By said worm wheel 87 three rolls 88 are driven and rotated respectively. On each of three rolls 88 a bobbin 89 for vertical reinforcement is provided and both parts are mounted on the main body 83. Reference numeral 90 designates an electrode for welding which is mounted on the machine body 84, and 91, a roller for supporting fabricated reinforced cage.

In the aforementioned structure, when the motor 81 is rotated, the main body 83 rotates together with the attached equipments, and simultaneously three rolls 88 are rotated and driven through gear 85, worm 86 and worm wheel 87, whereby vertical reinforcement 2 is fed at a linear velocity adapted to the pitch of spiral transverse reinforcement 1. The fed vertical reinforcement 2 travels to the left through a feeding hole $d$ in the main body 83, and comes into contact gradually with the spiral transverse reinforcement 1 directly below the electrode 90, where they are welded and fabricated to a cage shape. The completed reinforced cage is pushed to travel to the left by the vertical reinforcement 2 supplied while rotating by being supported by a roller 11, and cut down at a suitable position.

FIGS. 14 (A), (B), (C), (D) and (E) indicate another example of a device for continuously supplying the vertical reinforcement, i.e. a system where the tension reinforced is inserted simultaneously with the fabrication of reinforced cage. In the drawings, reference numeral 101 indicates the reduction machine driven by a motor (not shown) and rotates a rotary cylinder 102 at low velocity. A suitable number of bobbins 103 for use in vertical reinforcements are arranged in parallel with each other on said rotary cylinder 102, and further at the forward end thereof a straightening roller mechanism consisting of freely rotatable stationary rollers 104 and 104, shifting roller 104' and an adjusting bolt 105 is arranged in parallel. Reference numeral 106 designates a rotary disc secured to the forward end of the rotary cylinder 102, on said rotary disc 106 a hole $a$ for penetrating the vertical reinforcement 2 being formed. Reference numeral 107 designates a frame housing said rotary disc 106 in a freely rotatable manner, 108, a rotary cylinder to which an electrode receiver 109 is fitted. Reference numeral 110 designates a chuck which snaps the vertical reinforcement 2 and is driven in an adjust screw axis 112 attached to a disc 111. Said disc 111 is axially supported on a sliding base 113 in a freely rotatable manner. Reference numeral 114 designates a motor. The rotation thereof moves push electrode 118 which welds spiral transverse reinforcement 1 to the vertical reinforcement 2, the sliding base 113 and the disc 111 through a reduction machine 115, a clutch 116 and a pulley 117. Reference numeral 119 designates a bobbin for the transverse reinforcement which supplies the spiral transverse reinforcement 1 and is axially supported on a supporting base 120. Reference numeral 121 designates a frame on which the sliding base 113 is placed in a freely slidable manner.

In the aforementioned structure, the vertical reinforcement 2 is drawn out of the bobbin 103 and passed through a space between stationary rollers 104 and 104 of straightening roller mechanisms and the shifting roller 104' thereof and further penetrated, then passed through the bore $a$ of the rotary disc 106, further passed on the electrode receiver 109 fitted to the rotary cylinder 108, and thereafter snapped to the chuck 110 attached to the disc 111. Then, the spiral transverse reinforcement 1 is drawn out of a bobbin 119 and its one end is secured to the vertical reinforcement 2 by a spot welding or the like. By driving the reduction machine 101 by means of a motor (not shown) the rotary cylinder 102 is rotated, and simultaneously the motor 114 is put into motion and shifts the sliding base 113 to the left by means of a rack pinion mechanism, an endless chain mechanism or the like through the reduction machine 115, clutch 116 and pulley 117, and the same rotation as that of the rotary cylinder 102 is imparted to the disc 111 by means of a chain sprocket mechanism. Also, the rotation caused by the pulley 117 is operated to overlap the push electrode 118 on the electrode receiver 109. Upon this occasion, the vertical reinforcement 2 and the spiral transverse reinforcement 1 are overlapped between both electrodes 118 and 109 to be gradually weld together. In this manner, the vertical reinforcement 2 is drawn on the sliding base 113 whereby while the spiral transverse reinforcement 1 being gradually welded to the vertical reinforcements 2, reinforced cages are fabricated and when they reach a required length, both reinforcements 1 and 2 are cut. Then, by switching the lever of the clutch 116 a reverse rotation is imparted to the pulley 117 to shift the sliding base 113 to the right. Upon this occasion, it is possible to shift said base to the right at a speed rapider than that of the shift to the left of the fabrication step by the operation of the lever of reduction machine 115, and it is possible to change the pitch of reinforced cage by the change of shifting speed in the fabrication step due to the switchover of said lever.

Then, the automatic insertion device of tension reinforcement 3 in the aforementioned example will be explained hereinbelow. An end fitting plate 123 of tension reinforcement 3 is provided in the inner side of the center of the disc 111 in a freely detachable manner. On said fitting plate 123 a suitable number of recessed portions $b$ are provided for inserting the tension reinforcement 3 in the outer periphery thereof, further the outside thereof is provided with a binding device 124 such as a band or the like. Also, at the opposite side of the rotary cylinder to said disc 111 a supporting plate 125 of a type substantially the same as that of said fitting plate 123 is provided in a freely detachable manner. Said supporting plate 125 is provided with the clamping device 126. Said rotary cylinder 102 is hollow as far as the forward end and the tension reinforcement 3 is inserted from the right end.

In the aforementioned structure, at the initial stage of the reinforced cage fabricating operation the tension reinforcement 3 of predeterminedlength is inserted in a space therebetween at a state where the disc 111 and the rotary cylinder 108 approximate with each other, and the end portion loosely supported on the supporting plate 125 by the clamping device 126 is secured to the fitting plate 123 by the clamping device 124, and at this state the reinforced cage fabricating operation is carried out as has been described in the foregoing. Upon this occasion, reinforced cages are fabricated at the outside and simultaneously the tension reinforcement 3 can be automatically inserted into the already fabricated reinforced cage.

What We claim is:
1. A method of fabricating reinforcement for PC concrete pipes comprising:
   1. forming a first cage-shaped body of vertical and transverse nontension reinforcements;
   2. forming a pair of second cage-shaped bodies of vertical and transverse nontension reinforcements, said second cage bodies having a larger diameter than said first cage-shaped body;
   3. positioning but not attaching said second cage-shaped bodies at either end of said first cage-shaped body to form a cage-shaped body assembly;
   4. attaching an end surface metal fitting to each second cage-shaped body at each end of the cage-shaped body assembly;
   5. passing tension reinforcements vertically along the cage-shaped structures and through holes formed in each of said metal fittings, said tension reinforcements being longer than the distance between said metal fittings;
   6. forming hooking ends on each end of said tension reinforcements to prevent said reinforcements from passing back through the holes in said fittings, and
   7. pulling said metal fittings in opposite directions until said tension reinforcements are placed in tension.

2. The method of claim 1 wherein the transverse reinforcements of the central cage comprise a coil-shaped spiral reinforcement.

3. The method of claim 1 wherein the transverse reinforcements of the central cage comprise ring-shaped horizontal reinforcements mounted together by the vertical reinforcements.